United States Patent Office 3,192,178
Patented June 29, 1965

3,192,178
BLENDS OF RUBBERY DIENE POLYMERS, RESINOUS STYRENE-ACRYLONITRILE POLYMERS, AND A SULFONE
Costas H. Basdekis, Longmeadow, Mass., Erhard J. Prill, St. Louis, Mo., and George E. Walker, East Longmeadow, Mass.
No Drawing. Filed Dec. 29, 1960, Ser. No. 79,152
2 Claims. (Cl. 260—30.8)

This invention relates to blends of a rubbery diene polymer and a resinous styrene-acrylonitrile type copolymer. More particularly, the invention relates to such blends having improved processability.

Known blends of rubbery diene polymers and resinous styrene-acrylonitrile type copolymers include both mechanical blends of the rubber and resin and blends wherein at least a portion of the rubber and resin are united in chemical combination. The latter type of blend is usually prepared by (1) dissolving the preformed rubber in a mixture of the resin-forming monomers, subsequently polymerizing the monomers to graft at least a portion thereof onto chains of the preformed rubber, and then optionally adding supplemental resin to adjust the rubber/resin ratio or (2) polymerizing the resin-forming monomer mixture in an aqueous dispersion of the preformed rubber and then optionally adding supplemental resin to adjust the rubber/resin ratio.

Both the purely mechanical blends and the blends in which there is some chemical combination between the rubbery and resinous components suffer the disadvantage of having poorer processability than the corresponding blends in which a styrene-type resin is employed instead of the styrene-acrylonitrile type resin. When conventional plasticizers are added to the blends to improve their processability, the improvement in processability is accomplished only at the expense of unduly sacrificing the good physical properties of the blends, particularly the tensile strength.

One object of this invention is to provide improved blends of a rubbery diene polymer and a resinous styrene-acrylonitrile type copolymer.

Another object is to provide a method of improving the processability of blends of a rubbery diene polymer and a resinous styrene-acrylonitrile type copolymer.

A further object is to provide a method of improving the processability of such blends without unduly sacrificing their good tensile properties.

These and other objects are attained by modifying a rubbery diene polymer/resinous styrene-acrylonitrile type copolymer blend containing 5–40% by weight of the rubbery diene polymer by incorporating therein 1–20%, based on the weight of the rubber-resin blend, of a sulfone having a boiling point not lower than 170° C. and a melting point not higher than about 260° C. and corresponding to the general formula:

wherein R and R' are independently selected from the group consisting of hydrocarbon radicals, hydroxy-substituted hydrocarbon radicals, and alkoxy-substituted hydrocarbon radicals.

The following examples are given to illustrate the invention. Unless otherwise specified, quantities mentioned are quantities by weight.

EXAMPLE I

Part A.—Preparation of rubber

A rubber latex is prepared from the following polymerization recipe:

| Component: | Parts |
|---|---|
| Water | 200 |
| Butadiene-1,3 | 90 |
| Styrene | 10 |
| Divinyl benzene | 0.75 |
| Sodium stearate | 5 |
| t-Dodecyl mercaptan | 0.4 |
| Potassium persulfate | 0.3 |

The water and sodium stearate are charged to a suitable, agitated reaction vessel, deoxygenated by boiling, and cooled under nitrogen. The remaining components are then added to the vessel, and the reaction mixture is heated at 60° C. for about 14 hours. The batch is cooled and stripped of unreacted monomers.

Part B.—Preparation of graft copolymer

The rubber latex of Part A is used in preparing a graft copolymer latex. An aliquot of the rubber latex containing 100 parts of rubber solids is purged with nitrogen, 50 parts of an 80:20:0.5 mixture of styrene, acrylonitrile, and t-dodecyl mercaptan are added to the purged latex, and a solution of 0.1 part of potassium persulfate in 55 parts of water is then added. The reaction mixture is heated at 70° C. with agitation for 3 hours in an inert atmosphere, cooled, and stabilized by the addition of 2 parts of a styrenated phenol antioxidant.

Part C.—Preparation of resin

Four resinous styrene-acrylonitrile copolymers are prepared in the following maner. A solution of 2 parts of sodium stearate in 150 parts of water is charged to a suitable, agitated reaction vessel, deoxygenated by boiling, and cooled under nitrogen. A styrene/acrylonitrile/t-dodecyl mercaptan mixture and a solution of 0.25 part of potassium persulfate in 50 parts of water are then separately and continuously charged to the agitated vessel over a period of 2 hours, with an inert atmosphere and a reaction temperature of 95–100° C. being maintained throughout the addition. After completion of this addition, the reaction mixture is cooled to terminate the reaction.

The amounts of styrene (S), acrylonitrile (AN), and t-dodecyl mercaptan (TDDM) used in the preparation of each of the resins and the specific viscosities (Sp. Vis.) of the resins, in each case measured as a solution of 0.1% of the polymer in dimethylformamide at 20° C., are as follows:

| Resin | S | AN | TDDM | Sp. Vis. |
|---|---|---|---|---|
| I | 72 | 28 | 0.4 | 0.060 |
| II | 80 | 20 | 0.3 | 0.068 |
| III | 80 | 20 | 0.2 | 0.074 |
| IV | 85 | 15 | 0.3 | 0.054 |

The rubber and resin latices prepared in Example I are used in preparing the polyblends of the subsequent examples. Unless otherwise stated, the following procedure is followed in preparing and testing these polyblends.

PROCEDURE

The graft copolymer latex of Part B of Example I is combined with one of the resin latices of Part C in such proportions that the rubber substrate of the graft copolymer constitutes 20% of the total solids. The mixed latices are drum dried, and the recovered solids are mill rolled for 4 minutes on a two-roll rubber mill having the front roll temperature set at 150° C. and the rear roll temperature set at 125° C. The milled polyblend is ground to a fine powder, extruded at 218° C., cooled in a water bath, and injection molded at 205° C.

The minimum molding pressure at 185° C., an indication of the processability of the polyblend, is determined by molding samples of the polyblend, first at 1200 p.s.i. and then at gradually decreasing pressures, until an incomplete specimen for testing tensile properties is formed. The lowest pressure at which a complete specimen for testing tensile properties is formed is the minimum molding pressure.

The tensile properties of the polyblend are determined in accordance with ASTM test D638-52T.

EXAMPLE II

Polyblends A, B, and C are prepared from the graft copolymer latex and Resin II latex. The procedure described above is followed with the exception that Polyblends B and C are modified by tumble-blending 100 parts of each of the ground polyblends with 4 parts of a processing aid for 30 minutes prior to extrusion. The processing aids employed are:

Polyblend A—none
Polyblend B—dioctyl phthalate
Polyblend C—diphenyl sulfone

The minimum molding pressures at 185° C. (MMP) and the tensile properties of the polyblends are shown in Table I.

TABLE I

| Polyblend | A | B | C |
|---|---|---|---|
| MMP (p.s.i.) | 1,025 | 800 | 800 |
| Tensile strength (p.s.i.): | | | |
| At yield | 5,700 | 4,800 | 5,700 |
| At fail | 4,800 | 3,700 | 5,700 |
| Tensile elongation (percent): | | | |
| At yield | 3.2 | 2.6 | 2.9 |
| At fail | 25.0 | 6.0 | 6.0 |

As exemplified above, the sulfone processing aids of the invention are as effective as dioctyl phthalate in improving the processability of the rubber-resin blends, as indicated by the decrease in minimum molding pressure at 185° C., and they have the advantage of improving the processability without causing a drastic reduction in the tensile strengths of the blends. Similar results are observed when the following polyblends are modified by incorporating these processing aids:

(1) Blend of 20 parts of a rubbery butadiene-acrylonitrile (90:10) copolymer and 80 parts of Resin I.
(2) Blend of Resin III with a graft copolymer prepared by dissolving 10 parts of a rubbery butadiene-styrene (60:40) copolymer in 90 parts of a 72:28 mixture of styrene and acrylonitrile monomers and polymerizing the solution in the presence of 0.03 part of benzoyl peroxide at 60° C. to substantially complete conversion of monomers to polymer. The resin and graft copolymer are mixed in such proportions that the rubber substrate of the graft copolymer constitutes 5% of the blend.

EXAMPLE III

Polyblends D, E, and F are prepared from the graft copolymer latex of Example I and the Resin IV latex. The procedure described above is followed with the exception that 100 parts of each of the ground Polyblends E and F are tumble-blended with di(hydroxyethyl) sulfone for 30 minutes prior to extrusion. The amounts of processing said employed are:

Polyblend D—none
Polyblend E—2 parts
Polyblend F—4 parts

The minimum molding pressures at 185° C. (MMP) and the tensile properties of the polyblends are shown in Table II.

TABLE II

| Polyblend | D | E | F |
|---|---|---|---|
| MMP (p.s.i.) | 1,000 | 885 | 770 |
| Tensile strength (p.s.i.): | | | |
| At yield | 5,700 | 5,600 | 5,500 |
| At fail | 5,000 | 4,800 | 4,700 |
| Tensile elongation (Percent): | | | |
| At yield | 3 | 2.9 | 2.8 |
| At fail | 16 | 12 | 8 |

As shown in the above table, the minimum molding pressure at 185° C. decreases with increasing amounts of sulfone processing aid. This result is also observed when the following sulfones are employed as processing aids: dipropyl sulfone, di(phenylmethyl) sulfone, phenyl ethyl sulfone, p-methylphenyl hydroxymethyl sulfone, and 2-methoxyethyl beta-naphthyl sufone.

EXAMPLE IV

Resin III' is prepared by repeating the preparation of Resin III with the exception that about 5.4 parts of diphenyl sulfone are continuously added to the reaction mixture during the addition of the monomer mixture and catalyst solution.

Polyblends G and H are prepared from the graft copolymer latex of Example I and Resin III and Resin III' latices, respectively, using the procedures described above. Polyblend H contains about 3.8 parts of the processing aid per 100 parts of rubber-resin blend. The minimum molding pressures at 185° C. and the tensile properties of the polyblends are shown in Table III.

TABLE III

| Polyblend | G | H |
|---|---|---|
| MMP (p.s.i.) | 1,025 | 825 |
| Tensile strength (p.s.i.): | | |
| at yield | 6,200 | 6,200 |
| At fail | 5,200 | 6,000 |
| Tensile elongation (percent): | | |
| At yield | 3.3 | 2.9 |
| At fail | 20 | 20 |

This example demonstrates that the processing aids of the invention can be incorporated into the polyblends by addition of the sulfone processing aid to the reaction mixture during the copolymerization of the styrene and acrylonitrile monomers instead of by extrusion blending with the rubber-resin blend. As shown in the above table, incorporation of the processing aid in this manner effects the same result of improving processability without unduly decreasing tensile strength. Similar results are observed when the processing aid is incorporated by mill rolling it with the polyblend, by adding it to the mixed rubber and resin latices and co-coagulating it therewith, or by adding it to the reaction mixture during the grafting of the monomer mixture onto the rubber substrate.

The process of the invention is a method of improving the processability of rubbery diene polymer/resinous styrene-acrylonitrile type copolymer blends containing 5–40% by weight of the rubbery diene polymer by incorporating therein 1–20%, based on the weight of the polyblend, of a sulfone having a boiling point not lower than 170° C. and a melting point not higher than about 260° C. and corresponding to the general formula:

wherein R and R' are independently selected from the group consisting of hydrocarbon radicals, hydroxy-substituted hydrocarbon radicals, and alkoxy-substituted hydrocarbon radicals.

The invention is applicable to the modification of both mechanical blends of the rubber and resin and blends in which there is some chemical combination between the rubbery and resinous components. Both types of blend are already well known to those skilled in the art.

The latter type of blend, usually called a graft copolymer blend, can be prepared by dissolving the preformed rubber in a mixture of the resin-forming monomers and subsequently polymerizing the monomers or, alternatively, by polymerizing the mixture of resin-forming monomers in an aqueous dispersion of the preformed rubber. In the preparation of these graft copolymer blends, all of the resin-forming monomers can be polymerized in the presence of the preformed rubber, or one portion of the resin-forming monomer mixture can be polymerized separately and then be blended with the graft copolymer prepared by polymerizing the remainder of the resin-forming monomer mixture in the presence of the preformed rubber. Various techniques for preparing these graft copolymer blends are described in the art.

Among the preferred blends which are modified in accordance with the present invention are the fusion blends obtained by comalaxating a binary mixture of the resinous copolymer and a graft copolymer prepared by polymerizing 15–90 parts by weight of the mixture of resin-forming monomers in an aqueous dispersion containing 100 parts by weight of the preformed rubber in the absence of any emulsifying agent other than that employed in the preparation of the preformed rubber.

The rubbery diene polymer which constitutes a component of the rubber-resin blends is a (co)polymer of 50–100% by weight of a conjugated diene hydrocarbon, 0–5% by weight of a copolymerizable monovinylidene aromatic hydrocarbon, 0–10% by weight of other copolymerizable monoethylenically unsaturated compounds, and 0–3%, preferably 0.1–1.5%, by weight of a cross-linking agent.

Particularly suitable conjugated diene hydrocarbons are butadiene-1,3, isoprene, and mixtures thereof. Monovinylidene aromatic hydrocarbons suitable as components of the rubbery polymers include styrene, alkyl-substituted styrenes such as alpha-methylstyrene, o-, m-, and p-methylstyrenes, o-, m-, and p-methyl-alpha-methylstyrenes, etc., vinyl naphthalene, and mixtures thereof. Exemplary of other copolymerizable monoethylenically unsaturated compounds are ar-chlorostyrenes, arcylic compounds such as acrylonitrile, methacrylonitrile, methyl methacrylate, butyl acrylate, etc., vinyl esters such as vinyl acetate, etc., and mixtures thereof. Among the suitable cross-linking agents are copolymerizable poly-unsaturated compounds containing terminal ethylenic groups as the only ethylenic unsaturation, e.g., divinyl benzene, diallyl maleate, diallyl fumarate, diallyl phthalate, diallyl adipate, allyl acrylate, allyl methacrylate, ethylene glycol dimethacrylate and other esters of acrylic or methacrylic acid with polyhydric alcohols, etc.

The resinous copolymer which constitutes a component of the rubber-resin blends is a copolymer of 65–90% by weight of a monovinylidene aromatic hydrocarbon (e.g., styrene, alkyl-substituted styrenes such as alpha-methylstyrene, o-, m-, and p-methylstyrenes, o-, m-, and p-methyl-alpha-methylstyrenes, etc., vinyl naphthalene, and mixtures thereof) and, correspondingly, 35–10% by weight of an unsaturated nitrile of the group consisting of acrylonitrile, methacrylonitrile, and mixtures thereof. The copolymers can includes minor amounts of a chain-transfer agent of the type frequently incorporated during the preparation of styrene-acrylonitrile type copolymers to regulate the molecular weight, e.g., a higher alkyl mercaptan such as t-dodecyl mercaptan, alpha-methylstyrene dimer, etc.

Sulfones utilizable in the practice of the invention are the liquid and solid sulfones having boiling points not lower than 170° C. and melting points not higher than about 260° C. and corresponding to the general formula:

wherein R and R' are independently selected from the group consisting of hydrocarbon radicals, hydroxy-substituted hydrocarbon radicals, and alkoxy-substituted hydrocarbon radicals. Exemplary of utilizable sulfones are dipropyl sulfone, di(phenylmethyl) sulfone, diphenyl sulfone, di-beta-naphthyl sulfone, dicyclohexyl sulfone, phenyl ethyl sulfone, ethyl beta-naphthyl sulfone, p-methylphenyl hydroxymethyl sulfone, di(hydroxyethyl) sulfone, 2-methoxyethyl beta-naphthyl sulfone, 2-methoxyethyl beta-naphthylmethyl sulfone, etc. Mixtures of two or more of such sulfones can be employed if desired.

The particular sulfone or mixture of sulfones to be employed as a processing aid in the practice of the invention should be chosen with regard to the temperature at which the polyblend is to be processed, usually a temperature in the range of 150–285° C. The melting point of the sulfone processing aid should be at least 25° C. lower than the processing temperature, and its boiling point should be at least about 20° C. higher than the processing temperature.

The amount of sulfone incorporated into the rubber-resin blend can vary from about 1–20% based on the weight of the polyblend (i.e., the combined weights of rubber and resin), but it is usually preferred to use amounts less than 10%, or even more preferably less than 6%, because the heat distortion temperatures of the polyblends are usually lowered and their tensile strengths frequently decrease with increasing amounts of processing aid employed. However, since the minimum molding pressure at which the polyblend can be molded at a given temperature also decreases with increasing amounts of processing aid employed, it is sometimes desirable to exceed the usually preferred amounts of processing aid when the heat distortion temperature and tensile strength of the polyblends are not very critical factors or when the tensile strength is not lowered substantially by the incorporation of large amounts of processing aid.

The sulfone processing aid can be incorporated into the rubber-resin blend by any suitable method, e.g., by extrusion blending with polyblend solids, mill rolling with polyblend solids, addition to polyblend latex and co-coagulation therewith, addition to the reaction mixture during the copolymerization of the styrene and acrylonitrile type monomers, addition to the reaction mixture during the grafting of the styrene-acrylonitrile type monomer mixture onto a preformed rubber substrate, etc.

The sulfone-containing rubber-resin blends of the invention can be modified by conventional additives such as stabilizers, antioxidants, fillers, colorants, etc., if desired.

The invention is advantageous in that the incorporation of the sulfone processing aid improves the processability of the rubbery diene polymer/resin styrene-acrylonitrile type copolymer blends without unduly lowering their tensile strengths, whereas conventional plasticizers can improve the processability only at the expense of unduly lowering the tensile strengths.

It is obvious that many variations can be made in the products and processes set forth above without departing from the spirit and scope of the invention.

What is claimed is:

1. A composition comprising an intimate mixture of (1) a blend of a resinous styrene-acrylonitrile copolymer containing 65–90% by weight of combined styrene and 35–10% by weight of combined acrylonitrile and a graft copolymer prepared by polymerizing 15–90 parts by weight of a monomer mixture consisting of 65–90% by weight of styrene and 35–10% by weight of acrylonitrile in an aqueous dispersion containing 100 parts by weight of a rubbery butadiene-styrene copolymer containing about 90% by weight of combined butadiene, about 10% by weight of combined styrene, and up to about 1.5% by weight of a cross-linking agent in the absence of any emulsifying agent other than that employed in the prepartion of the rubbery butadiene-styrene copolymer and (2) 1–6%, based on the weight of the blend, of di-(hydroxyethyl) sulfone.

2. A composition comprising an intimate mixture of (1) a blend of 5–40 parts by weight of a rubbery diene polymer and, correspondingly, 95–60 parts by weight of a resinous copolymer of 65–90% by weight of a monovinylidene aromatic hydrocarbon and 35–10% by weight of an unsaturated nitrile of the group consisting of acrylonitrile, methacrylonitrile, and mixtures thereof and (2) 1–20%, based on the weight of said blend, of di(hydroxyethyl) sulfone.

References Cited by the Examiner

UNITED STATES PATENTS

| | | | |
|---|---|---|---|
| 2,491,934 | 12/49 | Schlattman | 260—30.8 |
| 2,504,099 | 4/50 | Morris et al. | 260—30.8 |
| 2,522,776 | 9/50 | Busse | 260—30.8 |
| 2,643,987 | 6/53 | Harrison et al. | 260—45.5 |
| 2,740,766 | 4/56 | Stanton et al. | 260—30.8 |
| 2,811,497 | 10/57 | Ham | 260—30.8 |
| 2,850,478 | 9/58 | Coover et al. | 260—30.8 |
| 2,980,640 | 4/61 | Shoemaker et al. | 260—45.5 |
| 3,006,963 | 10/61 | Buc et al. | 260—607 |
| 3,073,798 | 1/63 | Baer | 260—45.5 |

MORRIS LIEBMAN, *Primary Examiner.*

DANIEL ARNOLD, ALEXANDER H. BRODMERKEL, LESLIE H. GASTON, *Examiners.*

UNITED STATES PATENT OFFICE
CERTIFICATE OF CORRECTION

Patent No. 3,192,178                                                 June 29, 1965

Costas H. Basdekis et al.

It is hereby certified that error appears in the above numbered patent requiring correction and that the said Letters Patent should read as corrected below.

Column 3, line 70, for "said" read -- aid --; column 5, line 33, for "0-5%" read -- 0-50% --; line 62, for "methyl-alpha-methylsyrenes" read -- methyl-alpha-methylstyrenes --; same column 5, line 67, for "includes" read -- include --; column 6, line 59, for "polymer/resin" read -- polymer/resinous --.

Signed and sealed this 7th day of December 1965.

(SEAL)
Attest:

ERNEST W. SWIDER
Attesting Officer

EDWARD J. BRENNER
Commissioner of Patents